Sept. 5, 1967   L. F. WARNOCK, JR   3,339,421
DYNAMIC GAS FILM SUPPORTED INERTIAL INSTRUMENT
Filed Nov. 14, 1963   5 Sheets-Sheet 1

INVENTOR.
LYLE F. WARNOCK, JR.

Sept. 5, 1967  L. F. WARNOCK, JR  3,339,421
DYNAMIC GAS FILM SUPPORTED INERTIAL INSTRUMENT
Filed Nov. 14, 1963  5 Sheets-Sheet 2

*INVENTOR.*
LYLE F. WARNOCK, JR.

INVENTOR.
LYLE F. WARNOCK, JR.

Sept. 5, 1967 L. F. WARNOCK, JR 3,339,421
DYNAMIC GAS FILM SUPPORTED INERTIAL INSTRUMENT
Filed Nov. 14, 1963 5 Sheets-Sheet 4

INVENTOR.
LYLE F. WARNOCK, JR.

INVENTOR.
LYLE F. WARNOCK, JR.

United States Patent Office 3,339,421
Patented Sept. 5, 1967

3,339,421
DYNAMIC GAS FILM SUPPORTED INERTIAL INSTRUMENT
Lyle F. Warnock, Jr., Grand Rapids, Mich., assignor to Lear Siegler, Inc.
Filed Nov. 14, 1963, Ser. No. 323,789
7 Claims. (Cl. 74—5)

This invention relates ot inertial instruments, and more particularly to inertial instruments including gyroscopes, accelerometers, and velocimeters, dynamically supported by a dynamic, compressible gaseous film.

In recent years, the demand for more sensitive instrumentation and control systems has increased substantially. Engineering advances have in response provided improved and high refined gyroscopes, accelerometers, and velocimeters. These improvements are usualy not fully effective, however, since the instruments are still limited by the ever occurring bearing coulomb friction and wear, contributing to short life of the instrument. Efforts to lessen these factors have stimulated developments in non-contacting bearings.

The improvements in non-contacting bearing supports have often caused increases in power consumption, and almost invariably have caused added design complexity. They require isolated fluid flow systems, usually with an external supply, for a controlled purity liquid or gas. Furthermore, the non-contacting bearing systems employed heretofore for inertial devices may still involve substantial coulomb friction. Pressurized gas bearings, while largely eliminating coulomb friction also limit a rotating device to rotation in one direction.

Therefore, although these refinements have indeed lessened some of the drawbacks of inertial instruments, these drawbacks still remain to a considerable extent. Also, new problems arise due to the refinement complexities introduced.

It is an object of this invention to provide a unique inertial instrument having negligible coulomb friction, and bearing noise, no bearing wear, and exhibiting an exceptionally long useful life.

It is another object of this invention to provide a long life inertial instrument that not only has negligible coulomb friction resulting in ultimate potential high sensitivity, but which also requires no external supply of controlled purity gas or liquid, no purifying means, and no complex sealing problems.

Another object of this invention is to provide an inertial instrument with a dynamic support system that is extremely dependable in operation over a long life, thereby substantially reducing the likelihood of bearing failure, even with rough usage.

Still another object of this invention is to provide a support system in an inertial instrument capable of uniquely, simply, effectively and dependably supplying peripheral support to moving components on a gas film, and also simultaneously supplying axial support due to the unique inter-action of the peripheral support means and end support means for the moving component.

Another object of this invention is to provide an inertial device and support system effecting its own lubrication without the addition of any lubricating materials from the outside. Moreover a dynamic gas film both supports and lubricates dependably in response to an electrical impulse control from a reliable conventional power supply means. Moreover, the novel instrument is relatively simple in construction and operation, is compact, sturdy, easily manufactured, and readily adapted to various applications, sizes and types of devices and systems.

These and several other objects of this invention will become apparent upon studying the following specification in conjunction with the drawings in which.

Since the inventive combination may assume the form of any of several different inertial instruments, four selected ones are illustrated herein for purposes of teaching the basic combination and concepts involved. For convenience, these are separated under four different headings, namely, Rate Integrating Gyroscope, Torque Rebalance Pendulous Accelerometer, Gyroscope Spin Motor, and Linear Accelerometer. The addition of other inertial instruments would only cause redundancy, especially when the main inertial instruments are shown and described.

Rate integrating gyroscope

Figure 1:
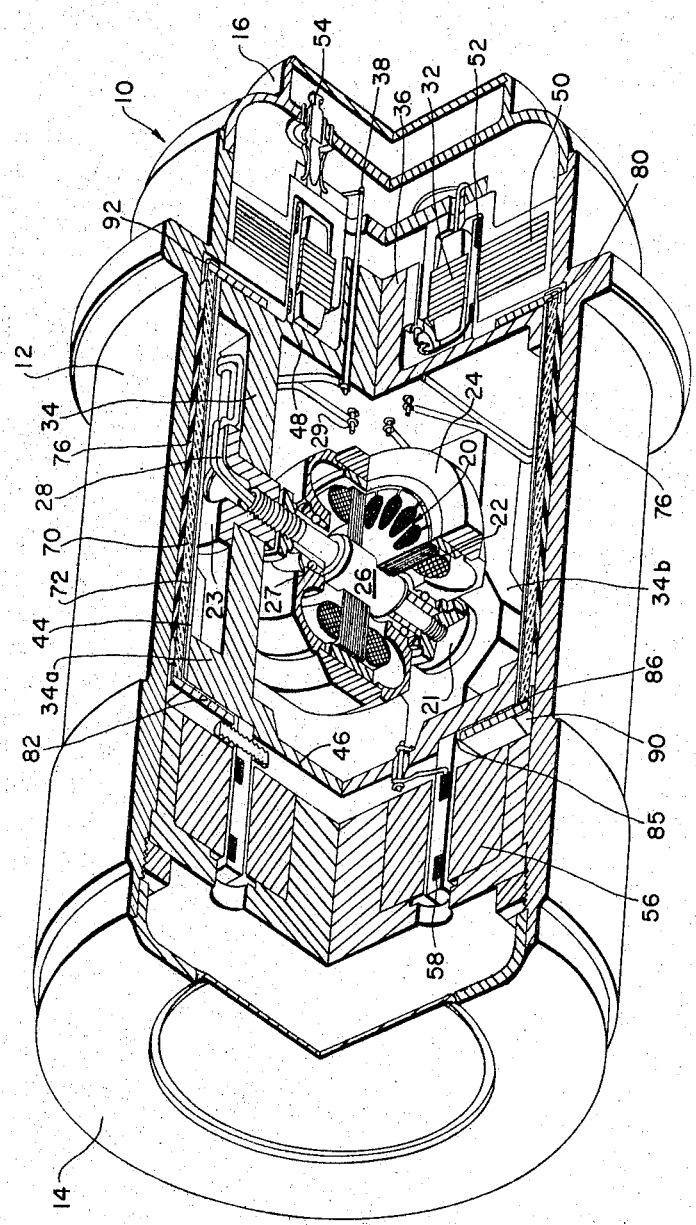
FIG. 1 is an isometric cutaway view of the first form of an inertial gyroscopic instrument employing the inventive combination.
Figure 2:
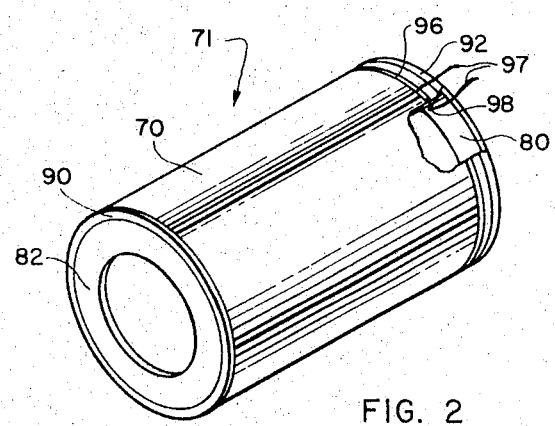
FIG. 2 is an isometric view of the dynamic support sleeve of the instrument in FIG. 1.

Referring to FIGS. 1 and 2 the form of the invention illustrated comprises a rate inegrating gyroscope 10 which includes an outer encasement 12 embodying the working components. This illustrative unit has one degree of freedom, but this is not essential to the invention. The casing is elongated, and generally cylindrical. It includes a first end cap 14 and a second end cap 16, both secured to the peripheral casing shell. Located intermediate the ends of and inside of the casing on a spin axis transverse to the axis of the cylindrical casing is a spin motor 20. It includes a stator 22 and a surrounding rotor 24, both mounted around the central axle 26. The axle is threadably mounted in a pair of fixed end supports 21 and 23. Electrical leads 28 extend out of the axle to terminals 29. These terminals are electrically connected to outside power supply means (not shown) to supply power to the electrical windings of the wheel stator to drive the rotor on bearings 27 on its spin axis. Instead of these ball bearings, the rotor may be dynamically supported like the rotor in FIG. 4, to be described. A gimbal 34 supports the ends of the axle 26 on two opposite elongated legs 34a and 34b which are integral with circular end portions 46 and 48. End plate 48 includes an extending axial portion 36 through which flex lead terminal elements 38 extend.

The gimbal 34 is enclosed peripherally as well as axially. Its peripheral enclosure means comprises a surrounding cylindrical shell 44 attached to the gimbal. The spin motor, gimbal and shell are adapted to freely rotate in a plane transverse to the elongated axis of the casing.

To detect this rotation a conventional pick off stator 32, back iron 50 and pick off rotor 52 are provided. The output signal of the pick off is passed through suitable terminals as at 54, through typical external circuitry (not shown) to feed back to the torque coil 58 on the opposite end of the instrument. The torque coil 58 in cooperation with torque magnet 56 causes a corrective torque to be applied to gimbal 34. The electrical current necessary to torque rebalance the gimbal is indicative of the input angular rate sensed. Instead of this feed back loop, an open loop mode for platform stabilization or strap-down angular reference could be employed.

Extending peripherally around shell 44 is a cylindrical pulser sleeve assembly 71. This is shown to be a piezoelectric ceramic cylinder 70 with a pair of end plates 80 and 82. Between the inner diameter of the piezoelectric cylinder 70 and the outer diameter of shell 44 is a slight air-gap bearing clearance 72 of a range approximately from a few ten thousandths to a few thousandths of an inch. This clearance spacing is uniform around the assembly. Its actual size in any given instrument can vary slightly according to the weight load of the gimbal to be supported, the type of gas in this clearance, the physical dimensions of the structure, and other like factors. The piezoelectric cylinder 70 is mounted to the inner diameter of the casing by a potting compound 76 such as an epoxy resin or the equivalent. This secures the element to a specific location and dimension. It also electrically insulates the cylinder from the casing and minimizes electrical loading of the ceramic. The gas film in clearance 72 is normally air.

The piezoelectric ceramic cylinder is preferably of a type known as PZT-4 manufactured and sold by Clevite Corporation. That is, it is a ceramic containing lead, zirconium, and titanium and, as a piezoelectric material, is capable of physically expanding and contracting under the stimulus of an electrical input. In other words, it is electro-strictive. The physical change in dimension is of course smaller than the clearance space, often being about ½ of the clearance.

Attached to the axial ends of the piezoelectric cylinder and extending radially inwardly are two annular end rings 80 and 82 on the opposite ends of gimbal 34. These form thrust bearing plates of annular circular configuration, and may be made of any suitable metal or ceramic. Since piezoelectric materials have physical movement in all three dimensions when stimulated, the cylinder not only expands radially inwardly to cause a contract with respect to the gimbal, but also expands axially. This axial expansion and subsequent contraction with removal of the stimulus causes axial shifting of the thrust plates 80 and 82. Therefore, the gap 86 on both ends of the gimbal contracts and expands as does the similar gap 72 with which it is communicating. These end plates are attached to the ends of the piezoelectric cylinder by any suitable means such as soldering or cementing. Annular corner cover elements 90 and 92 respectively for end plates 80 and 82 may be employed to make the attachment.

Electrical contact is made with both sides, i.e., the inner and outer diameter surfaces, of the piezoelectric cylinder, by utilizing a thin annular coating 96 of electrically conducting material such as silver metal around the outer periphery at one end of the cylinder, and a second inner annular coating 98 around the inner periphery. A pair of electrical leads 97 extend from the respective annular conductive rings out through end cap 16 and communicate with an external AC source of electrical energy (not shown). By applying an AC current to the piezoelectric cylinder, it physically expands and contracts at the applied frequency, causing the gaseous film in clearances 72 and 86 to repeatedly contract and expand dynamically. Usually the frequency of the current should be at a resonant frequency of the piezoelectric ceramic to maximize the oscillation amplitude and minimize power consumption. The pulsating action occurs so rapidly, that the gases in the film slot do not flow laterally out of the end clearances. Rather the gas repeatedly compresses and expands nearly isothermally with no significant lateral flow movement. As a consequence, a dynamic support film alternately under increased and decreased pressure occurs in the clearances. This effectively, efficiently, and dependably supports spin motor and gimbal with its enclosing support shell housing. The entire assembly is completely free to rotate on this gas bearing with no coulomb friction or hysteresis resulting.

It is held completely suspended in this pulsating dynamic gas film jacket. Further, the supporting compressible gaseous film also "lubricates" the movement automatically, simultaneously, and without added materials. The fluid suspending the unit must be compressible for the system to operate. Also, the clearance must be small and accurately controlled.

The specific AC frequency applied to the piezoelectric ceramic cylinder will vary with the amount of clearance, the load to be supported, the particular gas film utilized, and the size of the piezoelectric cylinder and other components cooperating with it. It has been found that a certain minimum frequency must be reached before the normal sized unit is held in suspension.

The end thrust elements 80 and 82 attached to the piezoelectric cylinder pulse at the same frequency axially of the unit to cause spacing gap 86 to be pulsed also. It has been found that a very slight amount of reversing gaseous flow occurs at the end 85 of the gap with pulsing of these end elements, but it is of negligible amount and effect when the bearing is in steady state. Basically therefore, the gas, usually air, in the clearances compresses and expands alternately, with relatively minor and insignificant lateral flow. The restricted nature of the clearance simply presents too much of an obstacle to the gases in the short time of compression to allow flow. As a consequence the axial and peripheral positions of the rotatable shell around the gimbal are fixed by the dynamic gas film.

It will be noted that the end support elements are operated uniquely by the peripheral support so that, merely by applying a pulsing electrical supply to the peripheral support, the entire assembly is located, suspended, and lubricated with the same fluid, ordinary air. No external gases are necessary. Nor is any sealing problem normally involved. The air is allowed to simply move through the assembly as necessary. It will be readily realized by those skilled in this field that the coulomb friction is so small as to be immeasurable. Further, the structure is capable of relatively inexpensive, simple, sturdy construction.

In operation, the unit is mounted in a suitable vehicle, such as an aircraft. The particular gyro shown, when used in a torque rebalance mode of operation, indicates rate of change of angular orientation, having one degree of freedom. The vibrator sleeve assembly is electrically actuated by an AC supply to cause its physical pulsation. Although the gimbal assembly will initially be resting on the cylinder 70 when at rest, it will immediately be suspended by the dynamic gas film. The spinning gyroscope acts in a conventional manner to rotate and cause the gimbal and its shell to rotate and precess when input rate occurs. This rotation causes an electrical output signal from the pick off rotor and stator assembly. The signal is fed back to the torque coil to rebalance the unit.

The preferred form of vibratory pulse element is the piezoelectric ceramic sleeve described and shown. It is conceivable however, that within the broader concept of this invention, other electro-strictive elements could be employed in place of the piezoelectric material. Also, magneto-strictive materials and elements could be substituted in some instances. It is even conceivable that in some circumstances, electro-mechanical vibratory mechanism could be employed. Consequently, these related but not equivalent forms of the inventive combination are considered to be within the scope of the general inventive concept taught and claimed. Each of these various types of pulsing equipment is not illustrated specifically since their substitution could be readily made according to known principles of operation, and their addition would only make the application unduly long and redundant.

*Torque rebalance pendulous accelerometer*

Figure 3:
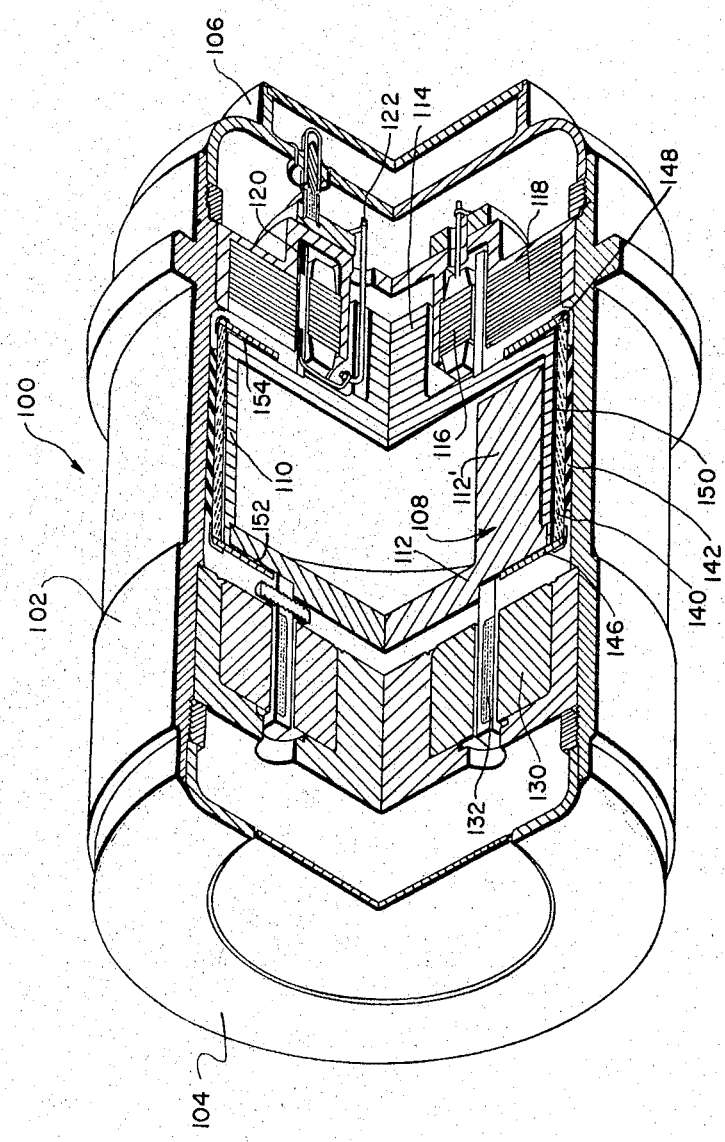
FIG. 3 is an isometric cutaway view of a second form of an inertial accelerometer instrument employing the inventive combination.

Referring to FIG. 3, a second form of inertial device employing the unique combination is there shown. This pendulous accelerometer 100 likewise includes an outer casing 102 with suitable end caps 104 and 106. Mounted centrally in the housing is a pendulous mass 108 which has a heavier portion on the lower side than on the upper side as illustrated. This pendulous mass is formed of two half shell housing components 110 and 112 which when fitted together and secured form a cylinrrical outer periphery. Half shell 110 is symmetrical about its axis, but half shell 112 is larger on one side due to its inside protrusion 112′.

Extending around the axially extending end portion 114 of the pendulous mass is a pick off stator 116, a pick off back iron 118, and pick off rotor 120. Again, suitable flex leads 122 extend out of the assembly.

On the opposite axial end of the entire assembly is a torque magnet unit 130 cooperating with torque coils 132. Since this is a rebalance unit, any rotation of the pendulous mass housing to cause an electrical signal from the pick off mechanism is amplified as usual (and externally of the instrument) and fed back into the coils of the torquer to cause the pendulous mass to be rotated to a null position. The current input can be measured to indicate the input linear acceleration which is taking place.

Around the cylindrical outer periphery of the pendulous mass cylindrical housing is an annular elongated piezoelectric ceramic cylinder 140. This cylinder is secured to the inner diameter of the housing periphery by a potting and insulating compound 142. Secured to the axial ends of this cylinder are the thrust end plate bearings 146 and 148 to form a support sleeve substantially like that shown in the previous form of the invention. A dynamic gaseous support bearing is formed in the clearance 150 between the piezoelectric cylinder and the outer periphery of the pendulous mass housing. This clearance again is in the neighborhood of several ten thousandths to a few thousandths of an inch, and communicates with the axial clearances 152 and 154 between the axial ends of the pendulous mass housing and the annular, radially extending, thrust plate elements 146 and 148. Again, this cylindrical piezoelectric element is electrically connected by suitable leads to an outside AC power supply. This again may be done by coating an annular conductive ring around the outer periphery and a second annular ring around the inner periphery of the piezoelectric ceramic cylinder, and attaching leads thereto.

In operation, the AC electric energy is supplied to the piezoelectric cylinder to cause it to expand radially and axially and alternately contract, thereby creating a pulsing, dynamic, gaseous squeeze-film support around the periphery of the device, and on its axial ends. This locates the device to allow it to rotate freely while limiting it radially and axially. The lubricant is again the compressed gas, usually air, which serves to support the unit. The pendulous mass freely rotates with no coulomb friction resulting, so that the unit can serve as an extremely sensitive inertial instrument. Those in the field will appreciate the fact that no unusual gaseous flow problems, sealing problems or purifying problems are involved at all. This therefore increases probability of long life significantly due to the decreased probability of failure from any one of these factors. The electro-strictive or magneto-strictive source is of course completely dependable for practically unlimited time periods since no material contact occurs. Failure is caused only with a power supply failure, but in that case all gyroscope motors would cease to operate anyway.

Gyroscope spin motor

Figure 4:
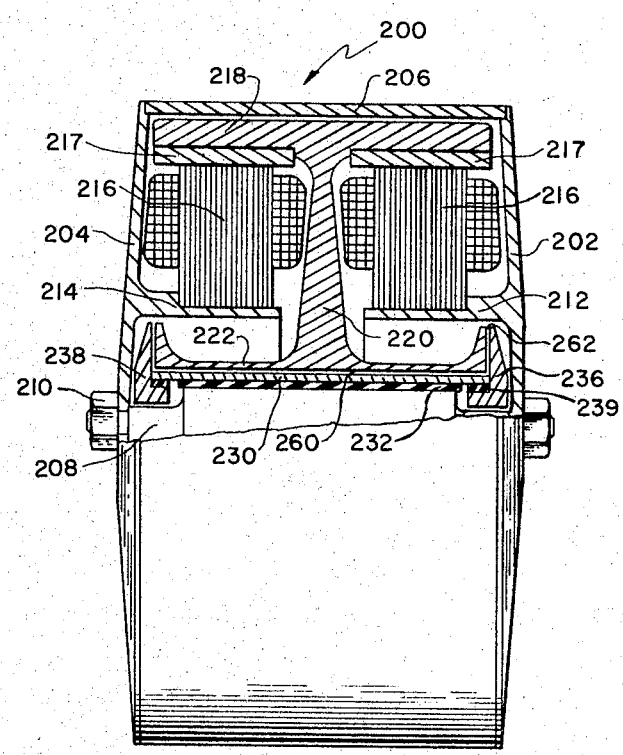
FIG. 4 is an elevational, partially sectioned view of a spin motor component of an inertial gyroscopic instrument showing a third form of inertial instrument employing the invention.

Referring to FIG. 4, the novel combination is there shown as a spin motor 200 for a gyroscope. It includes a cylindrical peripheral housing 206 which has a pair of end caps 202 and 204. This housing is symmetrical about a transverse spin axle 208 attached to the end caps by suitable nuts 210. An inwardly extending pair of annular support rings 212 and 214 of the end caps 202 and 204 support wound stators 216 of the spin motor. Positioned in cooperative relationship therewith is rotor 218 with its hysteresis rings 217. The rotor has a heavy inertial outer ring, a connecting web 220 extending radially inwardly from this ring, and an axially elongated cylindrical hub 222 connected to the web. This hub is hollow to have an elongated axial mounting passage through its center.

Affixed around the central cylindrical portion of axle 208 is a piezoelectric ceramic cylinder 230 which too is axially elongated. This piezo-ceramic may be of a material described with respect to the foregoing forms of the invention, and is electro-strictive to expand radially and axially when electrically stimulated. It is secured fixedly to axle 208 by a potting compound 232 to be stationarily mounted in the housing. It is also electrically insulated by the potting material. The axial ends of this sleeve extend beyond the enlarged central portion of axle 208, to cooperate with a pair of retaining end flanges 236 and 238. These form axial restraining elements similar to thrust bearing elements. These annular end elements are secured to piezoelectric cylinder 340 by potting compound 239. Between the accurately formed surface on the outer cylindrical diameter of piezoelectric cylinder 230, and the accurately formed surface on the inner diameter portion of hub 222 is an accurate air film peripheral bearing clearance 260. Communicating with this clearance is a pair of planar, axial end clearances 262 of a few ten thousandths of an inch.

In operation, when the magnet assemblies of the stator are activated by supplying power through suitable leads, the rotor 218 rotates on its spin axis. Simultaneously, AC power is supplied to piezoelectric cylinder 230, causing it to radially expand and contract alternately at high frequency, and to axially expand and contract. The radial expansion causes alternate compression at very high frequency of the air film in clearance 260, to cause dynamic support and lubrication of the spinning rotor with an air jacket. Likewise, the air film in clearance 262 is compressed and expanded at high frequency to support and locate the axial ends of the rotor hub. The unit is thus uniquely supported with no measurable coulomb friction resulting. This rotor spin motor is placed within a gyroscope during use and renders the gyroscope capable of very stable operation and long life. It moreover is capable of bi-directional rotation, unlike a rotor suspended by a conventional gas bearing. The electrical connections to the piezoelectric cylinder may be made as described with respect to the foregoing embodiments, that is utilizing a pair of annular conductive ring coatings around the inner periphery and the outer periphery of the cylinder, and connecting leads thereto as shown and described previously.

Linear accelerometer

Figure 6:
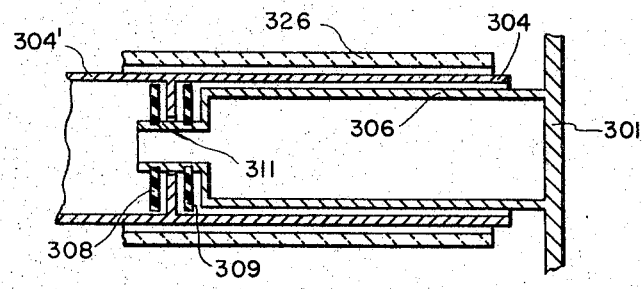
FIG. 6 is a sectional elevational view of portions of the instrument in FIG. 5.
Figure 5:
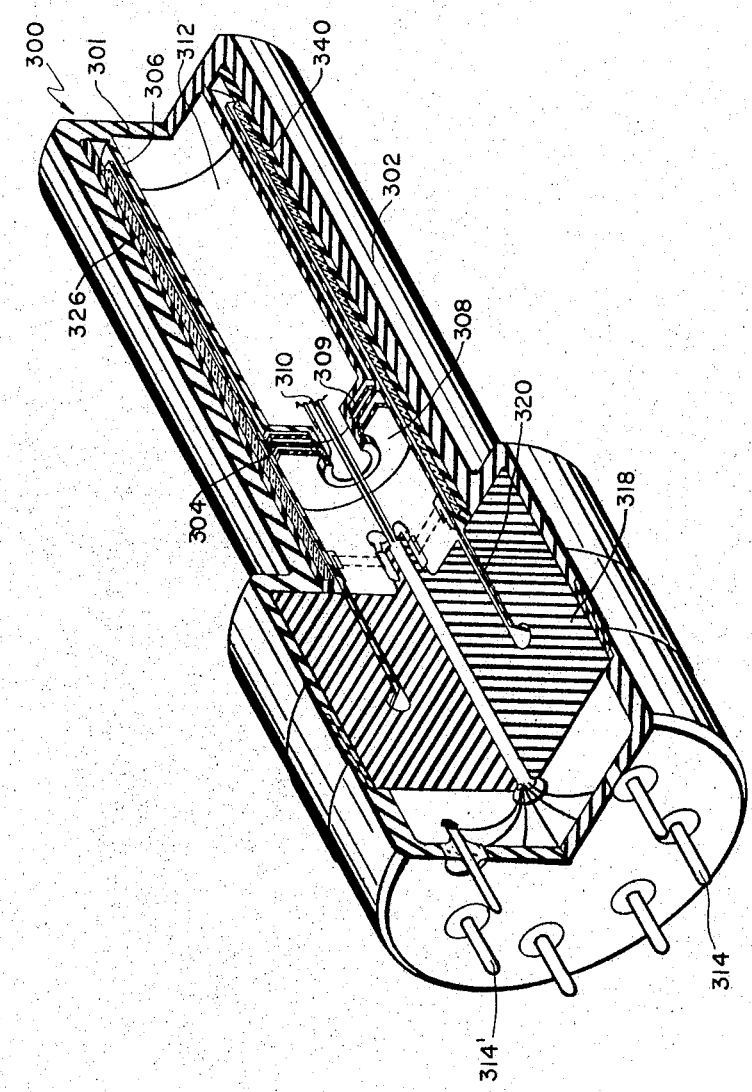
FIG. 5 is an isometric cutaway view of a fourth form of an inertial linear accelerometer instrument employing the invention.

In the fourth form of the inventive combination of inertial instrument and unique support means in FIGS. 5 and 6, device 300 comprises a linear accelerometer. The elongated housing 302 of generally cylindrical configuration is shown to have two portions of different diameters. It encloses a cylindrical proof mass 304 adapted to shift axially within the housing around the integral guide protrusion 306 extending inside the proof mass. The proof mass therefore comprises a cylindrical shell with one open end fitted around this guide portion. Acceleration of the vehicle in which the unit is mounted causes axial movement of this proof mass with respect to the housing.

This movement is indicated and detected by a capacitive sensor means adjacent one axial end of the proof mass. This capacitor sensor includes a pair of annular discs 308 and 309 on opposite sides of the cross web of the element 304. They are mounted on the nose 311 of guide 306 (FIG. 6). This displacement is electrically conducted through suitable leads 310 from suitable electronic equipment located inside chamber 312 (not shown since it forms no part of this invention). The change in capacitance therefore causes a changing output signal which, when conducted to the output terminals 314, is sent through an external feed back loop (not shown) into terminals 314' to activate the forcer field coil assembly 320. The field coil assembly 320 in cooperation with forcer magnet 318 axially shifts the proof mass back to its initial position. Here again, the amount of electrical current through the forcer coil required to null the shift indicates the input acceleration. The forcer magnet acts on a circular coil carrier which is an axial extension of the proof mass.

The peripheral cylindrical surface of the proof mass is accurately formed to a particular dimension. Likewise, the inner diameter of cylindrical piezoelectric ceramic support sleeve 326 is accurately machined to cause a definite, small, uniform clearance around the proof mass surface. The piezoelectric element extends axially from one end 301 of the housing to just adjacent the forcer field magnet, and around a portion of the armature to support this entire linearly shiftable element. The elongated piezoelectric sleeve is mounted within the inner diameter of the housing by a suitable potting compound 340. Electrical connections are made to the inner diameter and the outer diameter of the piezoelectric cylinder as previously described. Thus, the inertial mass is suspended on a gas film which is dynamically compressed and expanded, usually at several thousand cycles per second. The unit has extreme sensitivity and long life with practically no wear.

It will be readily appreciated that in the first three forms of this invention, the axial support and lubrication is achieved simultaneously with the radial support, using the radial support vibratory element.

Figure 7:
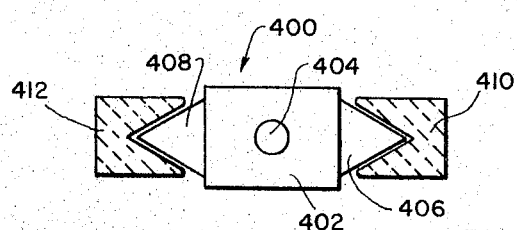
FIG. 7 illustrates a conical, axial support for an inertial instrument.

Consequently, three-dimensional support and suspension are achieved in these first three forms of the invention, with the suspended element being fixed axially as well as radially. This same three-dimensional suspension can be achieved in another related way by having the dynamic air film in the form of a cone on each end of the inertial mass. Thus the ends of the inertial mass could comprise conical axial protrusions fitting with slight clearance within a pair of like conical recesses in the support such as a gimbal. The conical recesses would be formed by pulsing elements such as piezoelectric ceramic elements. A graphic representation of this is shown in FIG. 7 where the rate integrating gyroscope 400 is shown to include a gimbal 402 supporting a spin motor 404 in the manner illustrated and described with respect to FIG. 1. The gimbal support 402 includes the conical axial protrusions 406 and 408 on opposite ends, interfitting with conical recesses in piezoelectric supports 410 and 412 with a clearance of a few ten thousandths of an inch. The supports, which are anchored, are connected in electrical parallel to an AC source to cause simultaneous pulsing along the conical surface of the recesses to effect movement in all three dimensions for three-dimensional support. This three-dimentional support could also be supplied with spherical support means for a spherical inertial unit.

Various additional specific advantages not recited herein will be apparent to those in the art upon studying this invention. Also, it is conceivable that this combination could be applied to other specific forms of inertial instrument. These four are shown as examples to illustrate the preferred embodiments. Consequently, obvious structural modifications within the disclosed concept of the invention are deemed to be part of this invention, which is to be limited only by the scope of the appended claims and the reasonably equivalent structures to those defined therein.

I claim:

1. An inertial device dynamically supported in non-contacting condition in three dimensions, comprising: a rotative inertial means having a generally cylindrical peripheral surface; a support means for said inertial means, having a generally cylindrical surface closely adjacent to and slightly spaced from said inertial means surface to form a definite uniform, peripheral clearance therebetween; thrust bearing plates extending radially from said support means adjacent the axial end of said inertial means and forming a controlled gas filled end clearance therefrom communicant with said peripheral clearance; said plates being axially shifted with axial pulsing of said support means to cause the gas in said end clearances to be compressed in pulsing fashion with compression of the gas in said peripheral clearance to form a three dimensional dynamic support film.

2. An inertial device comprising: a rotative inertial means having a generally cylindrical peripheral surface; a support means for said inertial means, having a generally cylindrical surface closely adjacent to and slightly spaced from said inertial means surface to form a definite uniform, perihperal clearance therebetween; said support means including portions extending radially adjacent the axial ends of said inertial means and forming a continuation clearance therebetween; said support means being axially and radially expansible and contractible upon being electrically stimulated with pulsing supply means, to cause said clearance to alternately contract and expand; a compressible gas film in said clearance, compressible and expansible with each clearance contraction and expansion to create a dynamic suspension film; said portions being axially shifted in pulsing manner with pulsing of said support means to alternately compress and expand gas in the end clearances at high frequency to control the end positions of said inertial means; said inertial means being free to rotate in said support means while dynamically suspended in a steady condition; rotational torque means adjacent said support means and operably associated with said inertial means to correct any rotational precession thereof; and housing enclosure means around said torque means, said inertial means, and said support means.

3. A gyroscope spin motor comprising: a spin axle; an elongated cylindrical bearing support sleeve on said axle; powered stator means around said axle; a rotor around said axle in operative relationship to said stator; said rotor including a hub having an internal diameter slightly larger than the external diameter of said support sleeve, forming a small, definite, controlled clearance therebetween; said clearance being filled with a compressible gas; and said bearing support sleeve being radially expandable and contractible upon being powered, to provide a pulsing gaseous compression when connected to a pulsing power supply, to dynamically suspend said rotor while rotating.

4. A gyroscope spin motor comprising: a spin axle; an elongated cylindrical bearing support sleeve on said axle; powered stator means around said axle; a rotor around said axle in operative relationship to said stator; said rotor including a hub having an internal diameter slightly larger than the external diameter of said support sleeve forming a small, definite, controlled clearance therebetween; said clearance being filled with a compressible gas; said bearing support sleeve being radially expandable upon being powered, to provide a pulsing gaseous compression when connected to a pulsing power supply; radially extending elements at the axial end of said rotor and attached to the axial ends of said sleeve; said sleeve being axially exandable and contractible when powered to shift said elements in pulsed fashion and control axial positioning of said rotor, while not interfering with its rotation.

5. A dynamically suspended device having an element with axial ends and a peripheral surface, comprising: a peripheral support sleeve adjacent the periphery of said element including a surface closely adjacent to but at a definite clearance from said element; said clearance being filled with a compressible gas; said support sleeve being of piezoelectric ceramic subject to radial and axial contraction and expansion when electrically stimulated; end cap means extending radially from and attached to said support sleeve closely adjacent to but at a definite clearance from said element ends to form gas-filled end clearances; and pulsing power supply means electrically connected to said sleeve to cause its radial expansion and contraction for peripheral dynamic gaseous suspension of said element, and to cause its axial expansion and contraction to shift said end caps in pulsing fashion for dynamic end support, thereby providing dynamic three dimensional support thereto.

6. An inertial instrument dynamically supported in noncontacting condition in three dimensions, comprising: support means; inertial means dynamically suspended by said support means on an axis; said support means including surface area closely adjacent surface area of said inertial means, and being in three dimensions closely adjacent three dimensional surface area of said inertial means to form a symmetrical, small clearance therebetween in three dimensions; a compressive gas film in said clearance; said support means being dynamically pulsating physically toward said inertial means, in three dimensions, with high frequency actuation thereof to create a three dimensional dynamic film support for said inertial means maintaining said inertial means in non-contacting condition.

7. A dynamically supported linear accelerometer instrument, comprising: a housing; a proof mass inside said housing, having a peripheral surface area and oriented on an axis; a dynamic support means in said housing, having a peripheral surface area matching that of and closely spaced from said proof mass peripheral surface area to form a small controlled peripheral clearance therebetween; said dynamic support means being physically radially expandable and contractible toward and away from said proof mass when activated; a compressive gas film in said clearance to form a dynamic frictionless support cushion for said proof mass when said dynamic support means is activated; said proof mass being shiftable controlled amounts on its axis from its initial position while so dynamically supported, in response to acceleration of said accelerometer along said axis; and means to return said proof mass to its initial axial position.

References Cited
UNITED STATES PATENTS

| | | | |
|---|---|---|---|
| 2,746,813 | 5/1956 | Massa | 308—1 |
| 3,018,142 | 1/1962 | Warnock | 74—5 X |
| 3,046,795 | 7/1962 | Wilkerson | 74—5 |
| 3,171,696 | 3/1965 | Houghton | 308—159 X |

MILTON KAUFMAN, *Primary Examiner.*

PALMER W. SULLIVAN, FRED C. MATTERN, *Examiners.*

F. E. BAKER, *Assistant Examiner.*